United States Patent Office 3,159,454
Patented Dec. 1, 1964

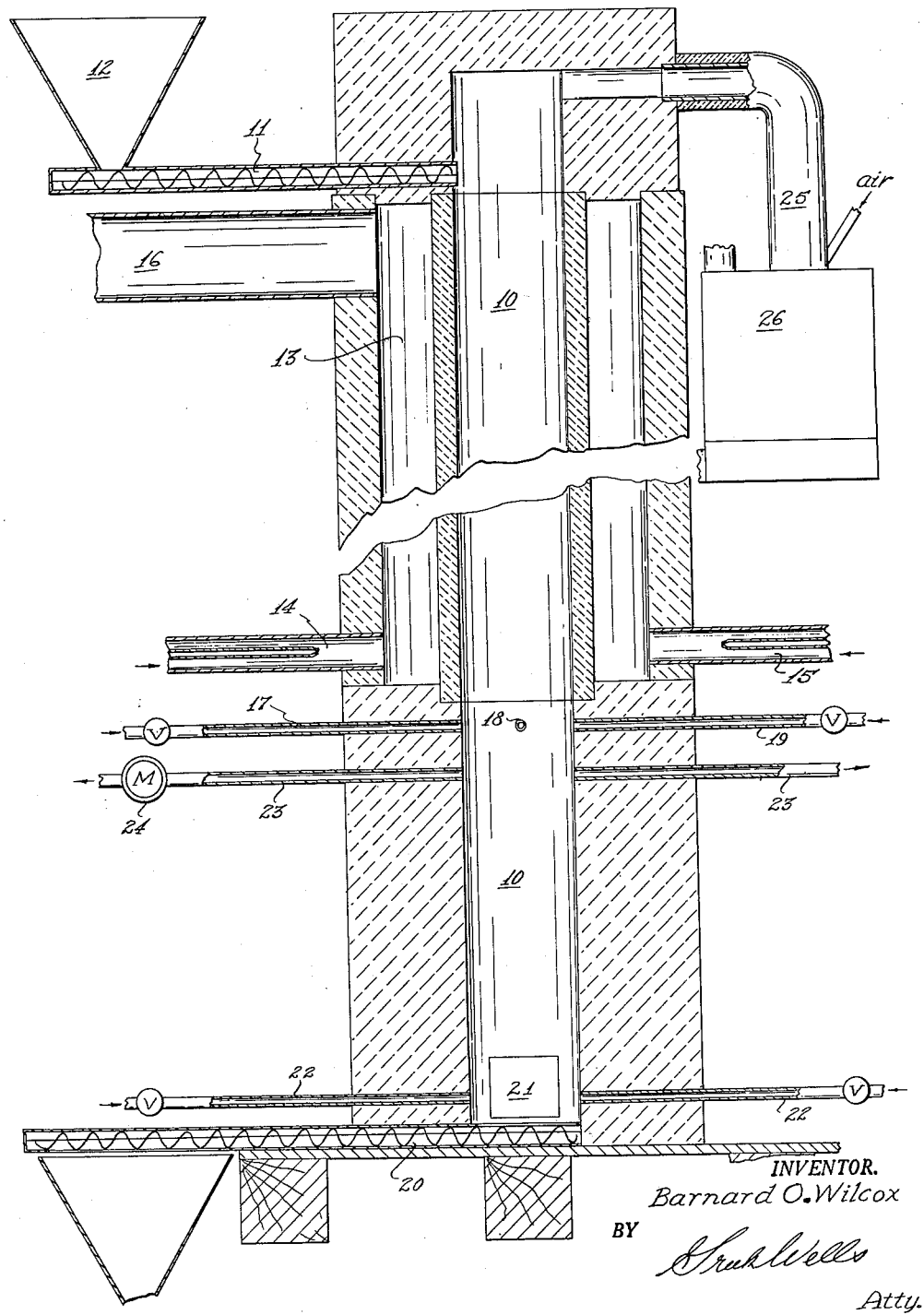

3,159,454
RECOVERING TiO₂ FROM ILMENITE
Barnard O. Wilcox, 10033 Des Moines Way,
Seattle 88, Wash.
Filed Sept. 26, 1960, Ser. No. 58,575
4 Claims. (Cl. 23—202)

This invention relates to the removal of iron from titanium- and iron-bearing ores in a low-cost operation. In one of its more specific aspects, this invention relates to the virtually complete iron removal. In another of its more specific aspects, this invention relates to TiO₂ production of a high purity and unusual crystalline nature.

The present invention is a continuation in part of my previous application Serial No. 336,701, filed February 13, 1953, now abandoned. The previous application described the chlorination of ilmenite at 1095° C. (2000° F.) without the use of a reducing agent and in a vertical furnace that involved the use of an inert gas in which the resulting TiO₂ product was bathed in order to cleanse it of adsorbed or absorbed traces of chlorine gas which tended to discolor the TiO₂ product. Since then I have discovered that the minimum critical temperature at which this process can be carried out is 1026° C., vaporization temperature of ferrous chloride ($FeCl_2$) at normal conditions of atmospheric pressure.

This present invention is applicable to ferro titanates, titano magnetites, and ilmenite which latter compound is generally represented by the formula $FeTiO_3$ and which formula will be used to illustrate this process. The principal purpose of my invention is to completely remove the iron and other impurities (that discolor the titanium oxide) by a chlorination operation, leaving the TiO₂ residue in a white crystalline form free of deleterious impurities.

Ilmenite in the natural state contains up to about 50% iron oxide. Other minerals often found in the ore are compounds, usually oxides, of silicon, aluminum, silver, copper, lead, potassium, zirconium, magnesium, chromium, tin, manganese, vanadium, and calcium. The oxides of silicon, aluminum, calcium, and zirconium are white and do not, in minute quantities, adversely affect the product for pigment purposes. When the ilmenite is treated according to my process, the colored oxides and compounds are so completely removed that very white particles of high purity are produced. These particles have about the same size as the original ilmenite particles but are now porous and have a low density. Upon examination they are found to be clumps of interlaced TiO₂ crystals of about 30-micron size. These crystals are easily reduced by known methods to single micron size for paint pigment and other purposes.

The TiO₂ crystals produced in the manner described herein serve as an ideal "raw" material for hydrometallurgical or gaseous treatment such as a chlorination process using an added reducing agent for the purpose of making titanium tetrachloride compounds and subsequently thereafter, the titanium metal. This is due to the fact that no other titanium dioxide material is known, natural or synthetic, to occur in any commercial quantity in as suitably a crystalline form as the TiO₂ product from my process. The TiO₂ product produced hereby being in small lumps of intermeshed acicular crystals allows processing gases a free flow throughout the particle. The individual crystals of microscopic size afford a large surface area per unit of weight making this a suitable material for use as a catalytic support. It is uniquely suitable for pulverizing into the required degree of fineness for paint pigment purposes. In addition, the porous structure and high purity of this granular product makes it directly suitable for subsequent chlorination to form a TiCl₄ product of commercial grade. Numerous normally required intermediate steps of briquetting prior to and purifying after chlorination are thereby eliminated.

The sheet of drawings illustrates diagrammatically a continuous operating furnace for recovery of the TiO₂.

In carrying out my process the ilmenite ore is used in coarse granular form. Ore that will pass a 60 mesh screen or even larger is satisfactory. It is brought into the top of a long vertical heating and chlorinating column 10, by a screw feed 11, from a hopper 12. The column 10 is surrounded by a heating chamber 13. Heat is supplied to the chamber 13 from burners 14 and 15. The combustion gases escape through an outlet 16. The column 10 extends below the burners 14 and 15. Chlorine gas inlets 17, 18, and 19 enter the column below the burners 14 and 15 and well above the bottom of the column 10. In the bottom of the column 10 a screw conveyor 20 is used to remove the finished product. A cleanout gate 21 is also provided at the bottom of the column 10.

When it is desired to obtain an extremely white product the chlorine gas may be prevented from passing downward with the titanium residue below the chlorine inlets. An inert gas or air or oxygen is supplied at inlets 22 and fed up through the lower portion of the column 10 and drawn off at outlets 23. The inert gas is fed at a pressure sufficient to substantially balance the chlorine pressure at the inert gas outlets 23. A recording and/or controlling instrument 24 can be set in the inert gas outlet 23 to detect and indicate or detect and control the amount of chlorine gas that is allowed to escape at this location along with the inert gas, air, or oxygen.

Initially the furnace is charged with titanium dioxide crystals to a point somewhat above the chlorine inlets. The remainder of the bed is made up of ilmenite ore. The ore must not be mixed with any carbon or other reducing agent. Then the burners are turned on and the temperature of the charge above the burner level is brought up to approximately 1090 degrees C. Then chlorine, preferably preheated to the temperature of the column, is introduced and passed up through the column of ore. The ore is gradually fed through the furnace by additions at the top and removal at the bottom of the column. The rate of flow of chlorine and ore are controlled so that the iron, the principal product to be removed, is substantially chlorinated in the upper portions of that part of the column above the chlorine inlet. Final traces of iron oxide and other deleterious oxides are removed as the product travels down to the level of the chlorine inlets.

The operating temperature of 1090° C. was found to be most suitable so as to assure that all parts of the primary reaction zone were above the critical temperature which is the temperature required to vaporize $FeCl_2$. This critical temperature is 1026° C. at atmospheric pressure and somewhat above that temperature in the slightly pressurized primary reaction zone of the furnace.

The reactions that occur are:

(1) $FeTiO_3 + Cl_2 \longrightarrow FeCl_2 + TiO_2 + \frac{1}{2}O_2$
(liquid or gas)

(2) $FeTiO_3 + 1\frac{1}{2}Cl_2 \longrightarrow FeCl_3 + TiO_2 + \frac{1}{2}O_2$
(gas)

(3) $FeT_2O_3 + 1\frac{1}{2}Cl_2 \longrightarrow \frac{1}{2}Fe_2Cl_6 + TiO_2 + \frac{1}{2}O_2$
(solid)  (gas)  (gas)  (solid)  (gas)

The FeCl₂ product is vaporized at atmospheric pressures and 1026° C. The FeCl₂ vapors further react with the excess chlorine present to form $FeCl_3$ or $Fe_2Cl_6$ gas accordingly:

(4) 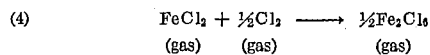

$$FeCl_2 + \tfrac{1}{2}Cl_2 \longrightarrow \tfrac{1}{2}Fe_2Cl_6$$
(gas)  (gas)  (gas)

As the gaseous iron chlorine products and oxygen pass up through the primary reaction zone 10 to the somewhat cooler secondary reaction zone at the top of the column they further react accordingly:

(5) 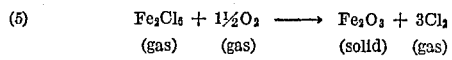

$$Fe_2Cl_6 + 1\tfrac{1}{2}O_2 \longrightarrow Fe_2O_3 + 3Cl_2$$
(gas)  (gas)  (solid)  (gas)

In order to carry out Reaction 5 additional oxygen must be added. The additional oxygen can be introduced below the charge by means of the inert gas inlets 22, thereby serving as both an inert gas in bathing the $TiO_2$ product and an oxidizer for the $Fe_2O_3$ formation. Or the additional oxygen or air may be introduced at the top of the column 10 or at any other point from there on out to the collection device 26 as depicted in the illustration. The essence of this invention is in no way limited to the use of nor location of the introduction of this air or oxygen ingredient. The additional air or oxygen is added only as a means of converting the iron chloride compounds to iron oxide compounds and simultaneously freeing the chlorine for re-use. The amount of this air or oxygen is controlled so as to provide substantial oxidation of the iron chloride compounds after their removal from the primary reaction zone.

The features of this application that segregate it from prior art lie in the discovery that a vast difference of $TiO_2$ product purity results from a minor difference in operating temperature. An important change occurs at the temperature at which my process is conducted (greater than 1026° C.) that does not occur at those temperatures stipulated in the prior art notably 900° to 980° C.

This change is the vaporization of $FeCl_2$. At temperatures below 977° C. both ferrous and ferric chlorides are formed. Above 977° C. ferrous chloride is the principal product.

| ° C. | Log K [1] | |
|---|---|---|
| | Reaction 1 ($FeCl_2$) | Reaction 2 ($\tfrac{1}{2}Fe_2Cl_6$) |
| 827 | +0.082 (l) | +0.253 (g) |
| 927 | +0.108 (l) | +0.075 (g) |
| 977±1 | (l) | 0.000 (g) |
| 1,027 | +0.091 (g) | −0.081 (g) |
| 1,127 | +0.462 (g) | −0.206 (g) |

[1] Enthalpy ($\Delta H$) and Entropy (S) values for the above evaluations of equilibrium (Log K) were taken from the National Bureau of Standards Circular 500 (1952) and "Heats of Formation of Ferrous Chloride, Ferric Chloride and Manganous Chloride" by M. F. Koehler and J. P. Coughlin (J. of Phys. Chem. 63,605, 1959). Sensible Enthalpy and Entropy temperature corrections were taken from U.S. Bureau of Mines Bulletin 584, 1959.

At 1026° C. $FeCl_2$ vaporizes, changing from liquid to gas. The vaporization of the $FeCl_2$ is vital to the successful completion of the process. Only in their gaseous states can the iron chlorides and therefore the iron component be removed to a commercially desired degree from the reaction zone and from the intricate crystalline grains that make up this zone.

I have found that with this process, the iron in the ore combines with the chlorine and leaves the titanium in the column. It is important that no reducing agent be added to the ore. Very little of the titanium is chlorinated resulting in negligible economic loss.

I find that a continued exposure of the ore to chlorine at the elevated temperature of from 1030° to 1100° C., after most of the iron has been chlorinated, is necessary in order to insure complete iron removal. Over 97% of the iron present is carried off as iron chloride in the upper one-fourth of that part of the column above the chlorine inlet. Therefore, the time allowed for the chlorine treatment to remove the last few percent of iron is three times that required to remove the bulk of the iron. The depth of the loose granular ore above the chlorine inlet and within the hot reaction zone may be as much as several feet thick. A substantial depth of the purified titanium oxide is also provided below the chlorine inlets. The titanium oxide cools sufficiently in traversing this lower portion of the column to permit removal with no difficulty.

Ilmenite is generally regarded as a ferrous titanate of the chemical formula $FeTiO_3$ (Chemical Rubber Handbook). When this ore with its various impurities is chlorinated in the manner hereinbefore set forth, the iron is combined with the chlorine, leaving the titanium with the correct amount of oxygen to form $TiO_3$. At least there is ample oxygen present to prevent the combination of titanium with the chlorine. When reducing agents such as carbon are present in the chlorination of ilmenite at temperatures referred to herein, the titanium oxide is reduced and the titanium combines with chlorine to form titanium tetrachloride. Chlorination in the presence of the added reducing agent produces a combination of iron and titanium chlorides that is objectionable and separable only at great cost and difficulty.

With my process there is always enough oxygen present to prevent any substantial combination of titanium with the chlorine. During chlorination the titanium oxide takes on a characteristic yellow color indicating conversion to the $TiO_3$ state. In the long hot period which follows the initial chlorination of the iron present in the ilmenite, with chlorine being increasingly concentrated as the particles move down toward the chlorine inlet, the last traces of iron and other colored oxides are chlorinated. The titanium at this temperature has such an affinity for the oxygen released by the iron, etc., that it apparently takes up this oxygen as fast as it is released and forms titanium tri-oxide ($TiO_3$). Further down the column the titanium relinquishes the extra oxygen during the cooling stage to form titanium dioxide ($TiO_2$), which is the desired form. The chlorine is substantially excluded from the ore in the lower part of the furnace by the presence of a neutral gas, air or oxygen which latter two gases would be acting as neutral gases at this location.

The process therefore is essentially one of initially heating the ore and passing chlorine through it in the presence of an excess of oxygen, gradually increasing the concentration of chlorine and decreasing the concentration of oxygen until the iron is completely removed, and then removing the residue in the form of a titanium dioxide product.

This particular method of chlorination of the ore also is particularly effective in removing the iron to the point where it no longer affects the color of the titanium oxide residue. Analysis of the residue show that the iron present is of the order of .01% to .0001%. Spectrographic analysis of the residue obtained by my process showed that such contaminants as aluminum, silver, copper, lead, tin, magnesium, potassium, manganese, vanadium and chromium, which are found in many ilmenite ores, were left in such minute amounts (less than 4 parts per million) that they could be disregarded. The silicon oxide and zircon oxide were within the range found in other titanium dioxide pigments marketed as 100% titanium dioxide.

It is believed that the nature and advantages of my invention will be clear from the foregoing description. Having thus described my invention, I claim:

1. A method of treating the iron titanium oxide ores such as ilmenite to recover the titanium in the form of titanium oxide crystals which consists in passing the ore material in granular form and free of my added reducing agent gradually downwardly in an elongated column, heating the upper portion of said column to bring the material therein to a temperature of about 1090 degrees C., forcing chlorine gas into the column at the bottom of the heated area thereof and upwardly through the downwardly moving granular material and gradually increasing the concentration of chlorine in the granular material as the material moves down through the heated area by combining iron in the ore with chlorine as fast as the chlorine rising through the material replaces the air and attacks the iron, circulating a neutral gas upwardly through the lower unheated portion of the column and drawing off the neutral gas from the column below the level of chlorine admission to the column.

2. The method of treating ilmenite to recover the titanium oxide substantially free of iron, said method comprising heating the ilmenite in granular form in the presence of chlorine gas free of an added reducing agent to a temperature in excess of 1026° C. thereby releasing oxygen by combining the chlorine with the iron in the ore, maintaining the residue at substantially the same temperature and passing chlorine through it to increase the concentration of the chlorine until substantially all of the iron has been removed from the residue, then removing the chlorine from the residue by flushing the residue with a gas inert to the residue.

3. The method of treating iron-titanium ore to recover the titanium in the form of titanium oxide crystals, said method comprising first subjecting the ore in granular form at a temperature in excess of 1026° C. to chlorine in the presence of oxygen to thereby effect a selective chlorination of the iron in the ore and to form iron chloride, removing the iron chloride vapors, continuing the heating of the remaining solids while increasing the chlorine concentration to further remove all traces of iron, and removing the entrained chlorine from the residual titanium dioxide by flushing the titanium dioxide with a gas inert to the titanium dioxide.

4. The method of treating iron-titanium ores to recover titanium oxide substantially free of iron, said method comprising heating the ilmenite in granular form in the presence of chlorine gas without added reducing agent to a temperature in excess of the vaporization temperature of ferrous chloride, thereby releasing oxygen by combining chlorine with the iron in the ore to form iron chlorides, then maintaining the ore at substantially the same temperature and passing a continuous flow of chlorine through it, thereby to increase the concentration of chlorine until substantially all iron has been removed from the residue, removing the chlorine from and simultaneously cooling the residue by flushing with oxygen, and utilizing the now hot oxygen to convert the iron chlorides to $Fe_2O_3$ thereby regenerating the chlorine.

References Cited in the file of this patent
UNITED STATES PATENTS

| 1,845,342 | Saklatwalla | Feb. 16, 1932 |
| 1,979,280 | Mitchell | Nov. 6, 1934 |
| 2,184,885 | Muskat et al. | Dec. 26, 1939 |

OTHER REFERENCES

Barksdale on Titanium, 1949 Ed., pp. 312, 313, Ronald Press Co., N.Y.